United States Patent [19]

Susnjara et al.

[11] Patent Number: 5,471,724
[45] Date of Patent: Dec. 5, 1995

[54] TOOLHEAD ASSEMBLY FOR MACHINE TOOLS

[75] Inventors: Kenneth J. Susnjara, Santa Claus; Michael P. Hardesty, Dale; Edwin H. Haefling, Evanston; Robert A. Hardy, Gentryville, all of Ind.

[73] Assignee: Thermwood Corporation, Dale, Ind.

[21] Appl. No.: 298,096

[22] Filed: Aug. 23, 1994

[51] Int. Cl.⁶ .............................. B23Q 5/32; B23B 39/16; B23C 1/08
[52] U.S. Cl. .................... 29/53; 29/55; 408/42; 408/130; 409/231
[58] Field of Search .................... 29/26 A, 50, 51, 29/52, 53, 54, 55, 57; 409/231; 408/42, 130, 51, 53, 238; 384/49, 227, 270; 92/116; 91/218, 27

[56] References Cited

U.S. PATENT DOCUMENTS

| 2,250,845 | 7/1941 | Stefano | 408/42 X |
| 2,740,258 | 4/1956 | Weber | 92/116 X |
| 3,164,040 | 1/1965 | Reynolds | 408/130 |
| 3,167,920 | 2/1965 | Fleury | 91/27 X |
| 5,016,335 | 5/1991 | Becker et al. | 29/57 |

FOREIGN PATENT DOCUMENTS

| 426798 | 1/1975 | U.S.S.R. | 408/42 |
| 654356 | 3/1979 | U.S.S.R. | 408/42 |
| 180513 | 7/1990 | U.S.S.R. | 408/42 |

*Primary Examiner*—William Briggs
*Attorney, Agent, or Firm*—Lalos & Keegan

[57] ABSTRACT

A toolhead assembly for a machine tool generally consisting of a housing supportable on the machine tool and having at least one elongated bore therein, a liner formed of a structural polymer material disposed in the bore, adhesively secured to the housing and having a cylindrical inner wall surface, a spindle shaft journal in the housing and disposed coaxially in the liner for axial displacement therein, the spindle shaft having a head section rigidly mounted on the spindle shaft and engagable in sliding relation to the liner inner wall to provide fluid chambers on either side thereof, means for injecting fluid under pressure selectively into the chambers for axially displacing the spindle shaft, means for spinning the spindle shaft about its axis and means for securing a tool bit to the spindle shaft.

23 Claims, 4 Drawing Sheets

TOOLHEAD ASSEMBLY FOR MACHINE TOOLS

This invention relates to toolhead assemblies for machine tools, and more particularly to an improved toolhead for such assemblies and an improved method of making the same. This invention further contemplates an improved spindle construction for such toolhead assemblies.

In the prior art, there has been developed a number of machine tools having a plurality of tools which may be employed selectively to provide a variety of different work functions. In one type of such machines, there is provided a toolhead assembly including a toolhead having a plurality of vertically disposed bores, each provided with a spindle which can be axially displaced to position a tool bit in an operative position for performing a work function on a workpiece positioned on a worktable of the machine. Often, such machines may be provided with as many as ten to twelve separate tools. If such machines are operated by controllers to position the tools in accordance with a program inputted or loaded into the controller, the positions of the spindles on the toolhead must be precisely located to properly execute command signals generated by the controller to produce the desired work functions.

In the manufacture of such toolheads, it has been the conventional practice to form such toolheads from metal blocks of material, usually aluminum, machine the metal block to provide the desired configuration of the toolhead and the spindle receiving bores and then to install the spindles in the machined bores, providing fluid actuating means for axially displacing selected spindles between operating and non-operating positions, and providing means for driving the spindles. Such assemblies typically are mounted on a bridge or gantry of a machine and are moveable along x, y and z axes to position selected tools with respect to one or more workpieces positioned on a worktable of the machine.

Because of the amount of machining required to provide as many as ten to twelve bores in such toolheads and the precision required in such machining, the conventional method of manufacturing such toolheads has been found to be not only time-consumming and expensive, but also to require the use of skilled machinists. It thus has been found to be desirable to provide an improved toolhead construction requiring less precision machining in the manufacture thereof.

Accordingly, it is the principal object of the present invention to provide an improved toolhead assembly for a machine tool.

Another object of the present invention is to provide an improved toolhead of a toolhead assembly for machine tools.

A further object of the present invention is to provide an improved toolhead assembly for a machine tool having a plurality of tools which may be selectively employed to perform a work function on a workpiece positioned on a worktable of the machine.

A still further object of the present invention is to provide an improved toolhead of a toolhead assembly utilizing a plurality of selectively employable tools which requires a minimal amount of machining in the manufacture thereof.

Another object of the present invention is to provide an improved method of manufacturing a toolhead assembly for a machine tool.

A further object of the present invention is to provide an improved method of manufacturing a toolhead of a toolhead assembly.

A still further object of the present invention is to provide an improved method of manufacturing a toolhead of a toolhead assembly for a machine tool requiring a minimal number of machining operations.

Another object of the present invention is to provide an improved method of manufacturing a toolhead of a toolhead assembly for a machine tool requiring no precision machining.

A further object of the present invention is to provide an improved spindle assembly for a toolhead assembly of a machine tool.

A still further object of the present invention is to provide an improved toolhead assembly for a machine tool which is simple in design, comparatively inexpensive to manufacture and highly effective in performance.

Other objects and advantages of the present invention will become more apparent to those persons having ordinary skill in the art to which the present invention pertains from the following description taken in conjunction with the accompanying drawings wherein:

FIG. 2a is an enlarged view of the area designated FIG. 2a in FIG. 2;

Figure 1:
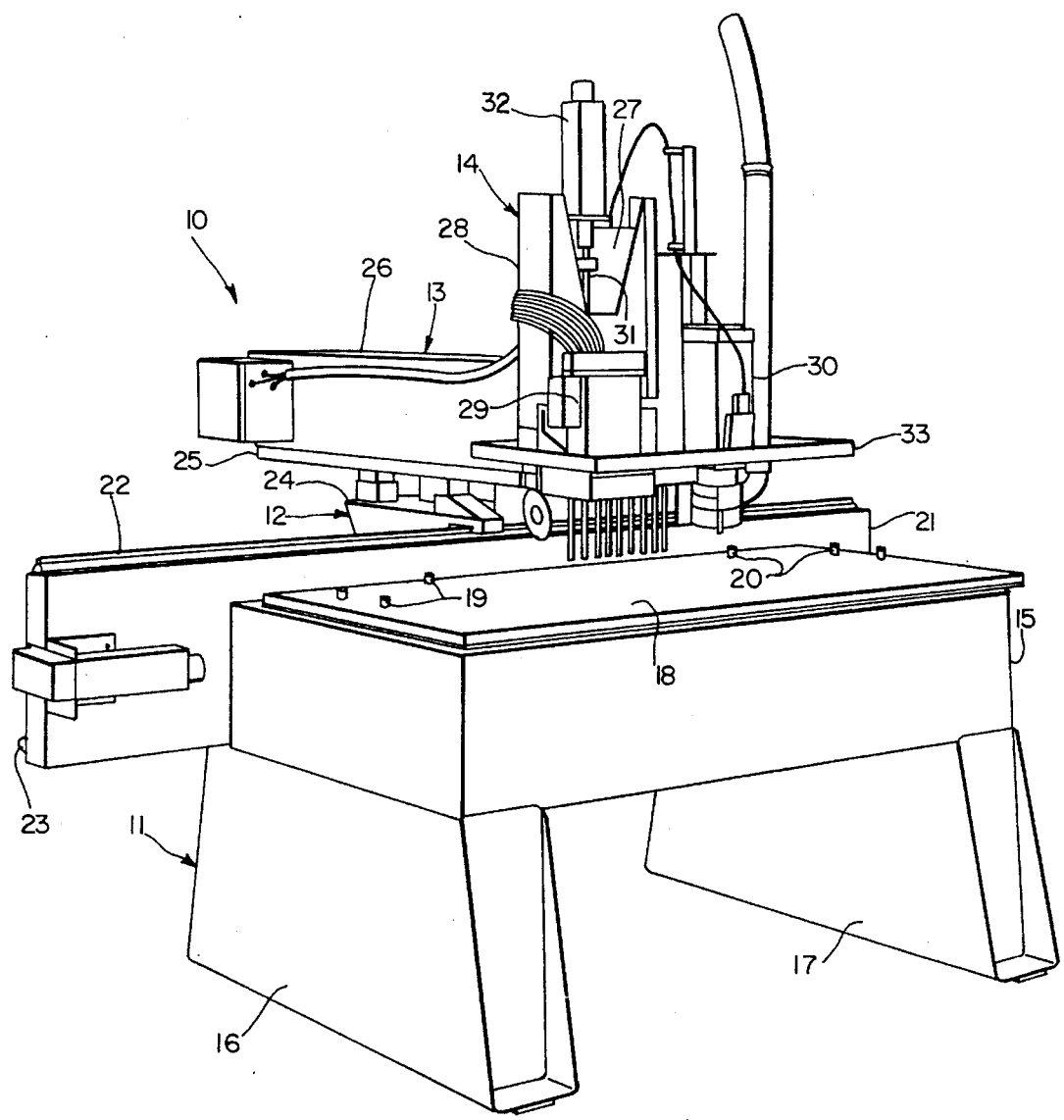
FIG. 1 is a perspective view of a machine tool provided with a toolhead assembly embodying the present invention.

Referring to FIG. 1, there is shown a machine tool 10 embodying the present invention. The machine is adapted to support one or more workpieces and to select and displace one of a number of tools longitudinally or what is commonly referred to as the x-axis, transversely or what is commonly referred to as the y-axis and vertically or what is commonly referred to as the z-axis, in accordance with a particular program inputted or loaded into a controller which operates the machine, to perform various selective work functions such as drilling, countersinking, chamfering, routing and sawing on workpieces supported on the machine. Generally, the machine consists of a base member 11, a transversely displacable carriage assembly 12 mounted on the base member, a longitudinally displaceable carriage assembly 13 mounted on carriage assembly 12 and a vertically displaceable toolhead assembly 14 mounted on carriage assembly 13.

Base member 11 includes a horizontally disposed main body section 15 supported on a pair of leg sections 16 and 17. Mounted on base section 15 is a worktable 18 on which one or more workpieces to be machined may be placed. The worktable is provided with sets of pins 19 and 20 which may be used to position various panel-shaped workpieces on the worktable to be machined. Various means including clamping devices and vacuum systems may be used to secure the workpieces in position on the worktable during the machining operations.

Mounted on the rear side of base section 15 and rigidly secured thereto by welding, is a vertically disposed, transversely extending beam section 21. As shown in FIG. 1, beam section 21 has a transverse length greater than the transverse length of base section 15 so that the end portions of beam section 21 project laterally relative to the sides of base section 15. Mounted on the upper edge of beam section 21 is a trackway 22. A similar trackway 23 is provided on the rear side of beam section 21 adjacent the lower edge thereof.

Carriage assembly 12 includes a base member 24 mounted on beam section 21 and a longitudinally disposed platform member 25. Base member 24 is supported on transversely disposed trackways 22 and 23 and is adapted to displace transversely or along the y-axis by means of a drive screw mounted on beam section 21, driven by a motor operated by the controller and cooperating with a follower provided on base member 24. Platform member 25 is provided with a pair of longitudinally disposed trackways (not shown) on which carriage assembly 13 is mounted.

Carriage assembly 13 includes a longitudinally disposed section 26 supported on platform member 25 of carriage assembly 12, and a vertically disposed support plate member 27 mounted on the front end of member 26. Longitudinally disposed member 26 is provided with a set of bearing pads mounted on the longitudinally disposed trackways on platform member 25, and is adapted to be displaced longitudinally or along the x-axis by a drive screw mounted on platform member 25, driven by a motor mounted on member 25 and operated by the controller and cooperating with a follower on member 26.

Toolhead assembly 14 generally includes a mounting member 28 supported on support plate member 27 for vertical displacement relative thereto, a toolhead unit 29 mounted on the mounting member and a router unit 30 also mounted on mounting member 28. Mounting member 28 is provided with a set of guideways cooperating with a set of vertically disposed trackways on support plate member 27 and is adapted to be displaced vertically by means of a drive screw 31 mounted on support plate member 27, driven by a motor 32 operated by the controller and cooperating with a follower mounted on mounting plate 28. Toolhead unit 29 and router unit 30 are rigidly mounted on mounting plate 28 so that such units will be displaced vertically upon energizing motor 32. The toolhead assembly further is provided with a guard rail 33 which encompasses the toolhead and router units for protection purposes and which further may be grasped and moved by an operator to manually displace the toolhead assembly.

Figure 2:
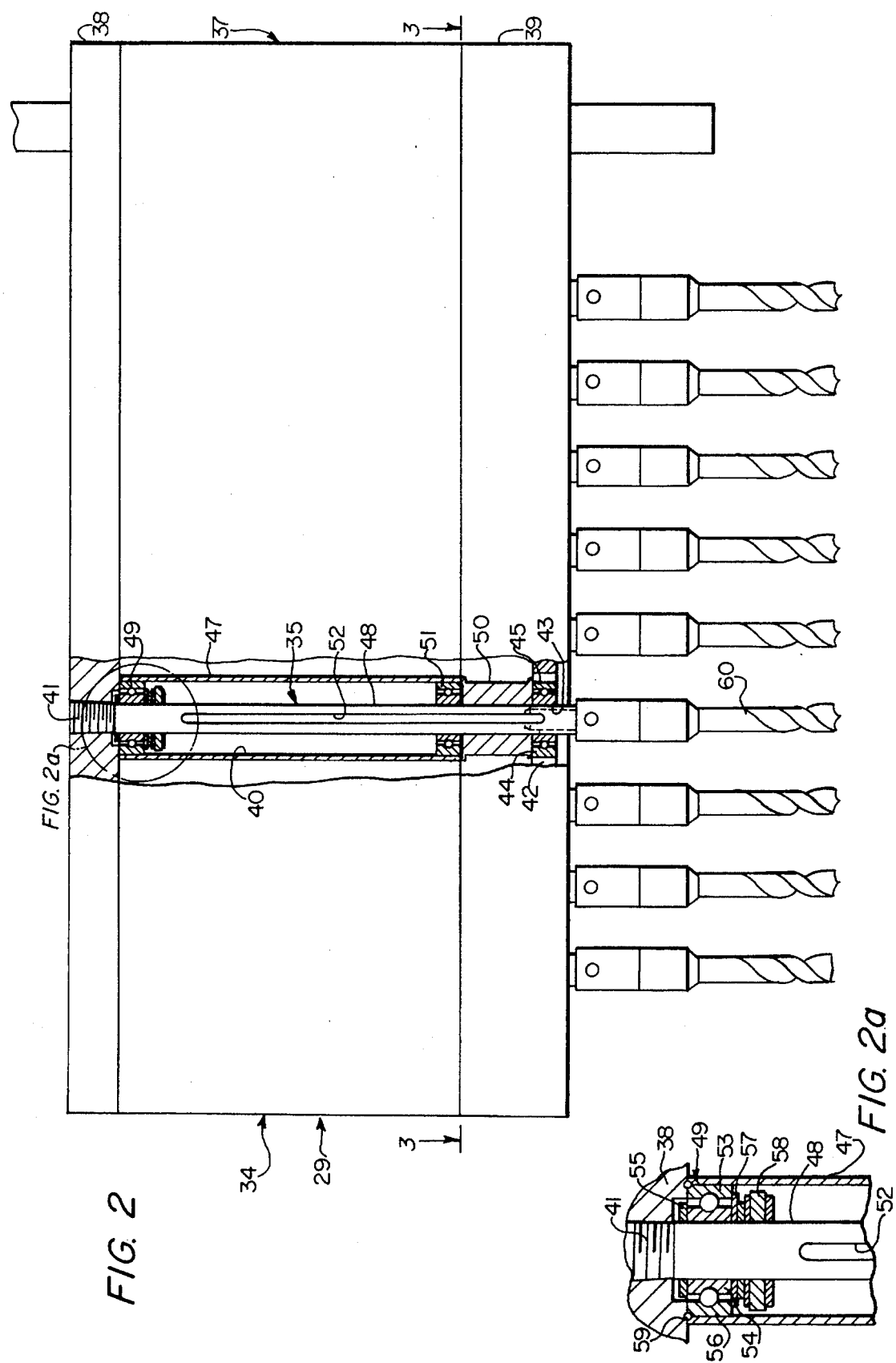
FIG. 2 is an enlarged front elevational view of a portion of the toolhead shown in FIG. 1, having a portion thereof broken away and illustrated in vertical cross-section.
Figure 3:
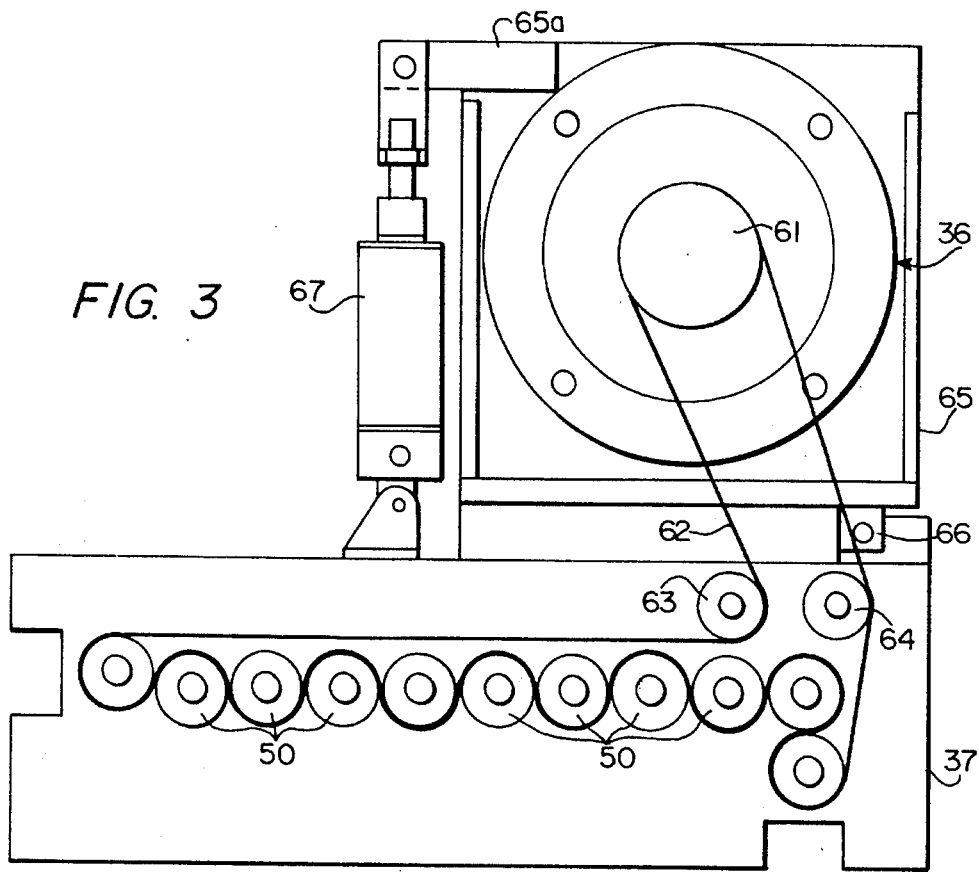
FIG. 3 is a reduced cross-sectional view taken along line 3—3 in FIG. 2.

Toolhead unit 29 is best shown in FIGS. 2, 2a and 3 and generally consists of a cast block member 34 rigidly mounted on mounting member 28, a plurality of spindle assemblies 35 mounted on the block member and a motor 36 supported on the block member and operatively connected to spindle assemblies 35 for driving the spindle assemblies. Block member 34 is made up of a main block section 37, an upper plate section 38 and a lower plate section 39. Main block section 37 is provided with a plurality of vertically disposed bores 40 in which the spindle assemblies are disposed. Upper plate section 38 is secured to the upper end of main block section 37 by means of a set of bolts and is provided with a set of threaded openings 41, each communicating with a bore 40 and adapted to receive a threaded end portion of an air line for supplying air under pressure to the upper end of the bore. Lower plate section 39 is secured to the lower end of block section 37 by means of a set of bolts and has a cut-out section in an upper surface thereof providing a lower wall 42. Lower wall 42 of lower plate section 39 further is provided with a set of openings 43, each of which is vertically aligned with a bore 39 in main block section 37. As best shown in FIG. 2, each of openings 43 is provided with an enlarged section 44 in which there is seated a roller bearing 45.

Figure 4A:
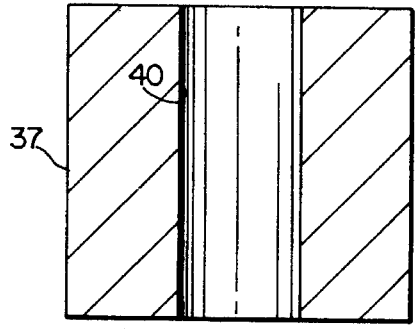
FIGS. 4a, 4b and 4c illustrate pictorially the sequence of a method of manufacture of the basic toolhead shown in FIGS. 1–3.
Figure 4B:
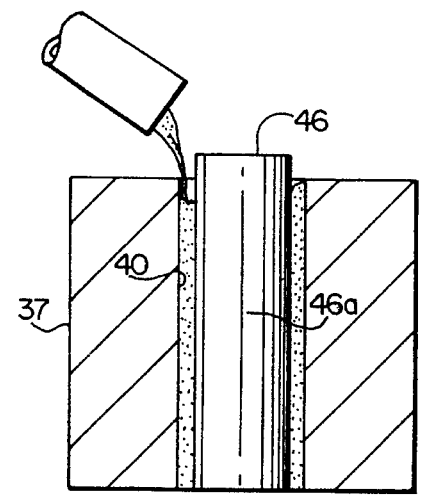
Figure 4C:
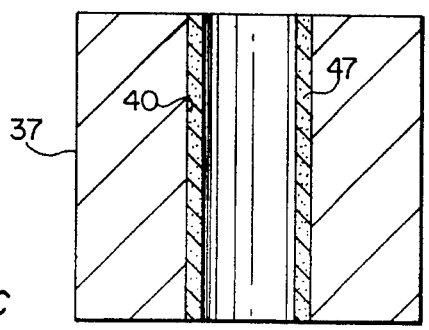

Block section 37 preferably is of a cast aluminum construction with bores 40 roughly formed during the casting operation. The sliding surfaces of the bores in which the spindle assemblies are disposed are formed by the method depicted in FIGS. 4a, 4b and 4c. Such method consists of positioning a core member 46 in each of bores 40, injecting an uncured formulation of a structural polymer into the peripheral space between each core member and the adjacent bore wall, allowing the formulation of the structural polymer to cure and harden, replicating the core member surface, and then removing the core member to provide a bore having a liner 46 for receiving a spindle assembly.

Core member 46 preferably is formed of steel having a polished, cylindrical surface 46a to be replicated by the structural polymer, and further is provided with a release agent to prevent the polymer from bonding to the core member. The structural polymer preferably is an epoxy based structural polymer having a low coefficient of friction, high wear properties, low abrasion rates, resistance to chemicals and coolants, a high compression strength and long-term dimensional stability to provide a finished bearing surface for a spindle assembly. The material should have a compression strength in the order of 23,000 psi and may be simply poured or otherwise injected into the peripheral space between the core member and the bore wall. A suitable structural polymer for such purpose has been found to be a polymer manufactured and sold by Diamant Metallplastic GmbH of Monchengladbach, Germany under the trademark MOGLICE. Such material is an epoxy based structural polymer which may be used in the form of a fluid having the consistency of gear oil or in the form of a putty. Preferably, the material is used in the form of a fluid and is injected into a lower area of the peripheral space to force out the air in such space thus preventing an air pockets or voids along the surface of the core member, and precisely replicate the polished surface of the core member. Upon the curing of the polymer and removal of the core member, there will be provided a sliding surface replicating the polished cylindrical surface of the core member and having the structural integrity and dimensional stability of a machined metallic surface. To enhance the lubricity of the surface, the structural polymer used may be formulated with a lubricant such as molybdenum disulfide.

Each spindle assembly 35 consists of a shaft 48 having a head section 49 and provided with a belt pulley 50. The shaft is journaled in bearing 45 and a second bearing 51 press fit in the lower end of bore 40. Belt pulley 50 is mounted on the shaft between bearings 45 and 51 and is provided with a key received within and cooperable with a longitudinal slot 52 in the shaft which permits the shaft to displace axially relative to the belt pulley while the belt pulley transmits rotary drive to the shaft.

As best seen in FIG. 2a, head section 49 includes a ball bearing 53 provided with an inner race 54 press fit on an upper end of shaft 48 and secured thereto by means of a retaining ring 55, and an outer race 56 disposed in sliding engagement with the inner surface of liner 47 to provide an upper chamber above the head section and a lower chamber below the head section of the spindle assembly. The head section further is provided with a thrust washer 57 which functions as a seal and a urethane washer 58 which functions as a cushioning element engageable with bearing 51 at the lower end of bore 40. Further sealing is provided by an O-ring 59 disposed between block section 37 and upper plate section 38. As shown in FIG. 2, a drill bit 60 or another type of tool bit is adapted to be detachably secured to a lower end of shaft 48, projecting through bore 43 in lower plate section 39.

Drive is transmitted from an output shaft 61 of motor 36 to the pulleys of each of the spindle shafts by means of a belt 62 which passes around a first idler pulley 63, and weaves around pulleys 50 and around a second idler pulley 64. As shown in FIG. 3, housing 65 on which drive motor 36 is mounted, is pivotably connected to block section 37, as at 66, and is provided with an air cylinder 67 interconnecting block section 37 and an arm portion 65a of housing 65 which may be operated to suitably tension drive belt 62.

In the operation of the machine as described, one or more workpieces to be machined are first positioned on worktable 18 and then a program corresponding to the machining operation to be performed on the workpieces is inputted or loaded into the controller. When the controller is then operated for the machine to execute the program, certain valves are actuated to supply air under pressure through a port 41 to bear on the head section of the selected spindle assembly and displace the selected tool bit downwardly into an operative position. Unless the program in the controller provides for the simultaneous use of more than a single tool bit for the machining operation to be performed, all of the other tool bits of the toolhead will remain in the retracted or inoperative positions as shown in FIG. 2.

With the selected tool thus extended downwardly in the operative position, the controller operates the various drive motors of the machine to displace the tool in the prescribed manner along the x, y and z axes. Upon completion of the machining cycle on a particular workpiece, the controller operates to return the toolhead to a start position to permit the removal of the machine workpiece and the mounting of the next workpiece to be machined. Such cycle is then repeated as desired until the lot of workpieces have been machined. Upon completion of the machining operation, the controller will operate to supply air under pressure to the lower chamber of selected bore 40 through a suitable port provided in block section 37 to cause the spindle assembly to retract and position the associated tool bit in the inoperative position. The controller will further function to return the toolhead assembly to a home or start position. If multiple operations are to be performed on a workpiece utilizing different tool bits mounted on the toolhead, the controller will function to extend and retract selected spindle assemblies according to the program being executed and will displace the selected tool bit or bits along the x, y, and z axes to perform the sequential machining operation on the workpiece.

By casting the main block section of the toolhead in aluminum with bores 40 roughly configured, and then forming the finished cylindrical walls of bores 40 by the use of the method as described, a substantial amount of time-consumming and precision machining is eliminated thus eliminating the need for skilled machinists in forming the toolhead of the toolhead assembly, and correspondingly reducing the manufacturing costs of the assembly. The formation of the finished bore surfaces may be done by semi-skilled workers accurately and expeditiously by the use of simple fixturing devices to properly position the core elements in the bores of the casting to provide the peripheral spacings in which the structural polymer material may be poured or injected to form the finished surfaces of the bores in the toolhead, properly spaced and aligned.

Figure 5A:
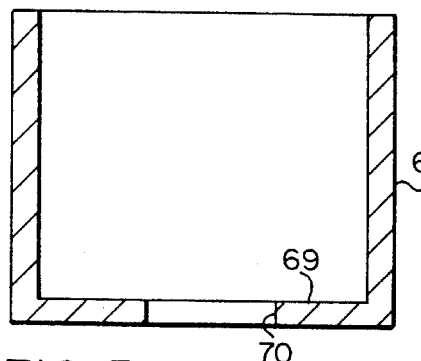
FIGS. 5a, 5b and 5c illustrate pictorially the sequence of an alternate method of manufacturing the basic toolhead shown in FIGS. 1–3.
Figure 5B:
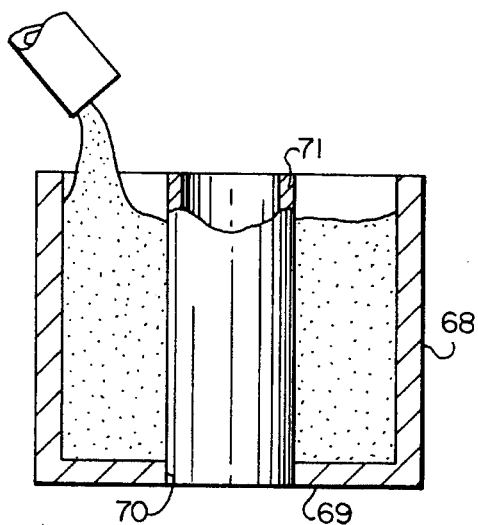
Figure 5C:
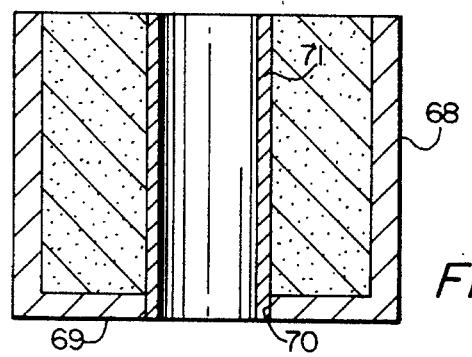

FIGS. 5a, 5b and 5c illustrate the sequential steps of an alternate method for forming a toolhead for the machine as described. Such method essentially consists of forming a housing of a rigid material, preferably of cast aluminum, having a set of side walls 68 and a bottom wall 69 provided with a plurality of openings 70, as shown in FIG. 5a, inserting tubular bushings 71 in the housing with the lower ends thereof received within openings 70, pouring or otherwise injecting an uncured structural polymer into the housing to encase the tubular bushings, as shown in FIG. 5b, and then allowing the polymer to cure and set to rigidly secure the tubular bushings in place, as shown in FIG. 5c.

Figure 6A:
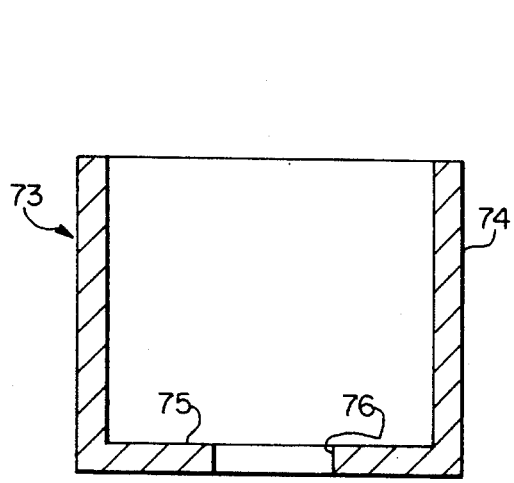
FIGS. 6a, 6b and 6c illustrate the sequence of steps of a still further method of manufacturing the basic toolhead shown in FIGS. 1–3.
Figure 6B:
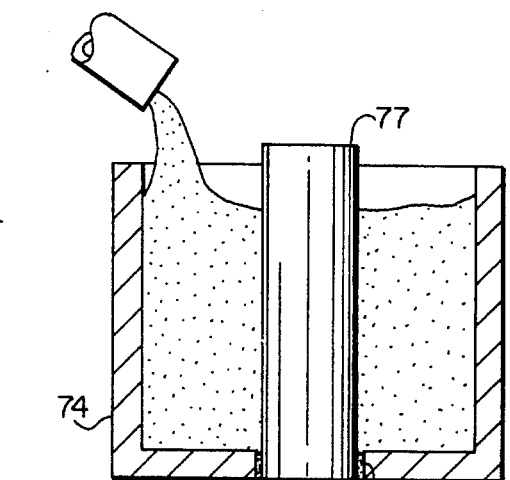
Figure 6C:
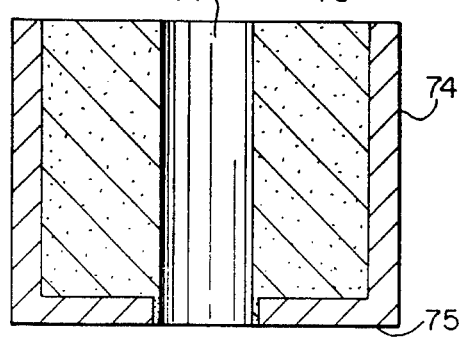

FIGS. 6a, 6b and 6c illustrate the sequential steps of a still further alternate method of forming a toolhead for use in the toolhead assembly shown in FIG. 1. Such method consists of forming a housing 73 of a sturdy material, preferably cast aluminum, having a set of side walls 74 and a bottom wall 75 having a plurality of spaced openings 76, as shown in FIG. 6a, positioning a plurality of core members 77 provided with polished cylindrical surfaces corresponding to the finished surfaces of the bores desired in the housing with the lower ends thereof received within openings 76 in the bottom wall and spaced from the annular walls of openings 76 to provide an annular space therebetween, as shown in FIG. 6b, pouring an uncured formulation of structural polymer similar to the material previously described in the housing to encompass the core members and fill the space between the housing and the core members, allowing the polymer to cure and set and then removing the core members to provide bores 77 having finished surfaces replicating the polished cylindrical surfaces of the core members.

From the foregoing detailed description, it will be evident that there are a number of changes, adaptations, and modifications of the present invention which come within the province of those persons having ordinary skill in the art to which the aforementioned invention pertains. However, it is intended that all such variations not departing from the spirit of the invention be considered as within the scope thereof as limited solely by the appended claims.

We claim:

1. A toolhead assembly for a machine tool comprising:

a housing supportable on said machine tool and having at least one bore therein;

a liner formed of a structural polymer disposed in said bore, adhesively secured to said housing and providing a cylindrical inner wall surface;

a spindle shaft journaled in said housing and disposed coaxially within said liner for axial displacement therein, said spindle shaft having a head section rigidly mounted on said spindle shaft and engagable in sliding relation to said liner inner wall surface to provide fluid chambers on either side of said head section;

means for injecting fluid under pressure selectively into said chambers for axially displacing said spindle shaft;

means for spinning said spindle shaft about its axis; and means for securing a tool bit on said spindle shaft.

2. An assembly according to claim 1, wherein said liner is formed of an epoxy based structural polymer.

3. An assembly according to claim 1, wherein said liner is formed of a structural polymer having a low coefficient of friction, high wear properties, low abrasion rates and long-term dimensional stability.

4. An assembly according to claim 1, wherein said structural polymer is formulated with a lubricant.

5. An assembly according to claim 4, wherein said lubricant is molybdenum disulfide.

6. An assembly according to claim 1, wherein said liner is formed of a structural polymer having a compression strength not less than 23,000 psi.

7. An assembly according to claim 1, wherein said housing is formed of a metallic material.

8. An assembly according to claim 1, wherein said housing is formed of aluminum.

9. An assembly according to claim 1, wherein said housing is formed of cast aluminum and said bore is formed when the housing is cast.

10. An assembly according to claim 1, wherein said head section comprises a ball bearing having an inner race rigidly secured to said spindle shaft and an outer race slidably engagable with said liner inner wall surface.

11. An assembly according to claim 10, wherein said head section includes cushioning means engagable with said housing.

12. An assembly according to claim 10, wherein said head section is disposed at one end of said spindle shaft.

13. An assembly according to claim 1, wherein said spindle shaft is journaled in at least one ball bearing mounted in said housing.

14. An assembly according to claim 1, wherein said means for spinning said spindle shaft comprises a belt pulley mounted on said spindle shaft.

15. An assembly according to claim 1, wherein said spindle shaft is provided with a longitudinally disposed key slot and said pulley is provided with a key element received within and cooperable with said slot to permit said spindle shaft and said pulley to rotate together and be displaced axially relative to each other.

16. An assembly according to claim 1, wherein said housing is provided with a pair of spaced ball bearings in which said spindle shaft is journaled and a belt driven pulley mounted on said spindle shaft between said ball bearings for rotational movement with said spindle shaft and axial displacement of said spindle shaft relative to said pulley.

17. An assembly according to claim 1, wherein said fluid injecting means includes ports disposed in said housing communicating with said fluid chambers, each selectively connectable to a fluid pressure source.

18. A toolhead assembly for a machine tool comprising:

a housing supportable on said machine tool;

at least one bushing having an inner cylindrical wall surface, disposed in said housing;

a body of structural polymer material disposed between said housing and said bushing;

a spindle shaft journaled in said housing and disposed coaxially in said bushing for axial displacement therein, said spindle shaft having a head section rigidly mounted on said spindle and engagable in sliding relation to said bushing inner wall surface to provide fluid chambers on either side thereof;

means for injecting fluid under pressure selectively into said chambers for axially displacing said spindle;

means for spinning said spindle shaft about its axis; and means for securing a tool to said spindle shaft.

19. A toolhead assembly according to claim 18, wherein said head section comprises a ball bearing having an inner race rigidly secured to said spindle and an outer race slidably engagable with said bushing inner wall.

20. A toolhead assembly for a machine tool comprising:

a housing supportable on said machine tool;

a body of structural polymer material disposed in said housing having at least one bore therein provided with a cylindrical surface;

a spindle shaft journaled in said housing and disposed coaxially in said bore for axial displacement therein, said spindle shaft having a head section rigidly mounted on said spindle shaft and engagable in sliding relation with said cylindrical surface to provide separate chambers on opposite sides thereof;

means for injecting fluid under pressure selectively into said chambers for axially displacing said spindle shaft;

means for spinning said spindle shaft about its axis; and means for securing a tool bit on said spindle shaft.

21. A toolhead assembly according to claim 20, wherein said body is formed of an epoxy based structural polymer.

22. A toolhead assembly according to claim 20, wherein said structural polymer is formulated with a lubricant.

23. A toolhead assembly according to claim 20, wherein said head section comprises a ball bearing having an inner race rigidly secured to said spindle shaft and an outer race engagable with said cylindrical surface in sliding relation thereto.

* * * * *